US008964211B2

(12) United States Patent
Koga (10) Patent No.: US 8,964,211 B2
(45) Date of Patent: Feb. 24, 2015

(54) DOCUMENT PROCESSING APPARATUS, DOCUMENT PROCESSING METHOD, DOCUMENT PROCESSING SYSTEM, AND COMPUTER READABLE MEDIUM FOR TRANSMITTING DOCUMENT INFORMATION ACCORDING TO A RULE SELECTED ON THE BASIS OF POSITION INFORMATION

(75) Inventor: Yumiko Koga, Kawasaki (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1042 days.

(21) Appl. No.: 12/634,188

(22) Filed: Dec. 9, 2009

(65) Prior Publication Data

US 2010/0321722 A1 Dec. 23, 2010

(30) Foreign Application Priority Data

Jun. 19, 2009 (JP) .................................. 2009-146504

(51) Int. Cl.
*G06F 15/00* (2006.01)
*G06Q 10/10* (2012.01)

(52) U.S. Cl.
CPC ...................................... *G06Q 10/10* (2013.01)
USPC ........................... 358/1.15; 709/226; 709/238

(58) Field of Classification Search
USPC .................................. 358/1.15; 709/226, 238
See application file for complete search history.

(56) References Cited

U.S. PATENT DOCUMENTS

| 2006/0053042 A1* | 3/2006 | Yoshimura et al. ................ 705/8 |
| 2007/0001904 A1* | 1/2007 | Mendelson .................... 342/450 |
| 2007/0180082 A1* | 8/2007 | Abraham et al. ............. 709/223 |

FOREIGN PATENT DOCUMENTS

| JP | 2002-281481 A | 9/2002 |
| JP | 2004-013409 A | 1/2004 |
| JP | 2004-094777 A | 3/2004 |
| JP | 2005-115519 A | 4/2005 |
| JP | 2007-295245 A | 11/2007 |
| JP | 2008-269298 A | 11/2008 |
| JP | 2009-124561 A | 6/2009 |

OTHER PUBLICATIONS

Japanese Office Action dated Jul. 2, 2013 issued in corresponding Japanese Patent Application No. 2009-146504.

* cited by examiner

*Primary Examiner* — Peter K Huntsinger
(74) *Attorney, Agent, or Firm* — Sughrue Mion, PLLC (57) ABSTRACT

A document processing apparatus includes: an acquisition unit that acquires position information that represents a position of a user who uses a document, and document information that represents the document; a rule management unit that manages a rule to determine a destination of the document information and a process executed to the document information transmitted to the destination; an execution unit that executes the process that includes a process to transmit the document information that the acquisition unit acquires to the destination determined by the rule according to the rule that the rule management unit manages, and is determined by the rule; and a switching unit that switches the rule that the execution unit follows, on the basis of a change of the position information that the acquisition unit acquires.

11 Claims, 8 Drawing Sheets

| RULE | INPUT | PROCESS | DELIVERY |
|---|---|---|---|
| RULE A | CONFIDENTIAL BOX A | AUTOMATIC ERECTION TILT CORRECTION FORMAT CONVERSION | •FOLDER AA–STORE DOCUMENT |
| RULE A' | CONFIDENTIAL BOX A | AUTOMATIC ERECTION TILT CORRECTION FORMAT CONVERSION OCR PROCESS "HEADING 2048 CHARACTERS" | •FOLDER AA–STORE DOCUMENT •MOBILE A–SEND OCR RESULT |
| RULE B | FOLDER B | FORMAT CONVERSION | •FOLDER BB–STORE DOCUMENT WITHOUT SECURITY |
| RULE B' | FOLDER B | FORMAT CONVERSION ((WITHOUT SECURITY), (WITH SECURITY)) | •FOLDER BB–STORE DOCUMENT WITHOUT SECURITY •MAIL ADDRESS A–SEND DOCUMENT WITH SECURITY |
| RULE C | CONFIDENTIAL BOX C FOLDER C | AUTOMATIC ERECTION TILT CORRECTION OCR PROCESS (WHOLE TEXT) | •DATABASE AA-STORE INPUT DOCUMENT AND SET OCR RESULT TO PROPERTY OF DATABASE |
| RULE C' | CONFIDENTIAL BOX C FOLDER C | AUTOMATIC ERECTION TILT CORRECTION OCR PROCESS (WHOLE TEXT) | •DATABASE AA-STORE INPUT DOCUMENT AND SET OCR RESULT TO PROPERTY OF DATABASE –TOKYO BRANCH OFFICE MFP-A |
| RULE D | CONFIDENTIAL BOX D FOLDER D | AUTO ERECTION TILT CORRECTION FORMAT CONVERSION | •MESSAGE NOTIFICATION TO PC •FOLDER - STORE DOCUMENT |
| RULE D' | CONFIDENTIAL BOX D FOLDER D | AUTO ERECTION TILT CORRECTION FORMAT CONVERSION (PDF) | •MAIL ADDRESS D - SEND PDF DOCUMENT |
| RULE E | CONFIDENTIAL BOX E1 CONFIDENTIAL BOX E2 | AUTO ERECTION TILT CORRECTION FORMAT CONVERSION | •AKASAKA HEAD OFFICE PRINTER A •DATABASE EE |

| RULE | INPUT | PROCESS | DELIVERY |
|---|---|---|---|
| RULE A | CONFIDENTIAL BOX A | AUTOMATIC ERECTION<br>TILT CORRECTION<br>FORMAT CONVERSION | ·FOLDER AA – STORE DOCUMENT |
| RULE A' | CONFIDENTIAL BOX A | AUTOMATIC ERECTION<br>TILT CORRECTION<br>FORMAT CONVERSION<br>OCR PROCESS "HEADING 2048 CHARACTERS" | ·FOLDER AA – STORE DOCUMENT<br>·MOBILE A – SEND OCR RESULT |
| RULE B | FOLDER B | FORMAT CONVERSION | ·FOLDER BB – STORE DOCUMENT WITHOUT SECURITY |
| RULE B' | FOLDER B | FORMAT CONVERSION<br>((WITHOUT SECURITY),<br>(WITH SECURITY)) | ·FOLDER BB – STORE DOCUMENT WITHOUT SECURITY<br>·MAIL ADDRESS A – SEND DOCUMENT WITH SECURITY |
| RULE C | CONFIDENTIAL BOX C<br>FOLDER C | AUTOMATIC ERECTION<br>TILT CORRECTION<br>OCR PROCESS (WHOLE TEXT) | ·DATABASE AA-STORE INPUT DOCUMENT AND SET OCR RESULT TO PROPERTY OF DATABASE |
| RULE C' | CONFIDENTIAL BOX C<br>FOLDER C | AUTOMATIC ERECTION<br>TILT CORRECTION<br>OCR PROCESS (WHOLE TEXT) | ·DATABASE AA-STORE INPUT DOCUMENT AND SET OCR RESULT TO PROPERTY OF DATABASE<br>·TOKYO BRANCH OFFICE MFP-A |
| RULE D | CONFIDENTIAL BOX D<br>FOLDER D | AUTO ERECTION<br>TILT CORRECTION<br>FORMAT CONVERSION | ·MESSAGE NOTIFICATION TO PC<br>·FOLDER - STORE DOCUMENT |
| RULE D' | CONFIDENTIAL BOX D<br>FOLDER D | AUTO ERECTION<br>TILT CORRECTION<br>FORMAT CONVERSION (PDF) | ·MAIL ADDRESS D - SEND PDF DOCUMENT |
| RULE E | CONFIDENTIAL BOX E1<br>CONFIDENTIAL BOX E2 | AUTO ERECTION<br>TILT CORRECTION<br>FORMAT CONVERSION | ·AKASAKA HEAD OFFICE PRINTER A<br>·DATABASE EE |

FIG. 4A

| BASIC RULE | ALTERNATIVE RULE | SWITCHING CONDITION ||||| 
|---|---|---|---|---|---|---|
| | | DEVICE | PLACE TYPE | FLOOR SPECIFICATION | EVENT | TIMING |
| RULE A | RULE A' | M-A | AKASAKA HEAD OFFICE | NOT SPECIFIED | DEPARTURE | IMMEDIATELY |
| RULE B | RULE B' | IC-A | KAWASAKI BUSINESS PLACE | VALIDATION ROOM | ARRIVAL | IMMEDIATELY |
| RULE C | RULE C' | IC-A | TOKYO BRANCH OFFICE | 8F REGULAR ROOM | ARRIVAL | IMMEDIATELY |
| RULE D | RULE D' | IC-A | UENO BRANCH OFFICE | 6F SHOWROOM | ARRIVAL | IMMEDIATELY |
| RULE E | NONE | — | — | — | — | — |

FIG. 4B

| BASIC RULE | ALTERNATIVE RULE | RETURN CONDITION |||||
|---|---|---|---|---|---|---|
| | | DEVICE | PLACE TYPE | FLOOR SPECIFICATION | EVENT | TIMING |
| RULE A | RULE A' | M-A | AKASAKA HEAD OFFICE | NOT SPECIFIED | ARRIVAL | IMMEDIATELY |
| RULE B | RULE B' | IC-A | KAWASAKI BUSINESS PLACE | VALIDATION ROOM | DEPARTURE | IMMEDIATELY |
| RULE C | RULE C' | IC-A | TOKYO BRANCH OFFICE | 8F REGULAR ROOM | PASSED TIME | 60 MINUTES AFTER ENTRANCE |
| RULE D | RULE D' | IC-A | NONE | NONE | SPECIFIED TIME | 17:00 |
| RULE E | NONE | — | — | — | — | — |

FIG. 4C

| USER NAME | MOBILE DEVICE | IDENTIFICATION NUMBER |
|---|---|---|
| A | M-A | 98734523 |
| B | M-B | 129872458 |
| C | M-C | 192837934 |
| ... | ... | ... |

FIG. 4D

| PLACE TYPE | AKASAKA HEAD OFFICE | TOKYO BRANCH OFFICE | UENO BRANCH OFFICE | GINZA BRANCH OFFICE | YOKOHAMA BRANCH OFFICE | KAWASAKI BUSINESS PLACE |
|---|---|---|---|---|---|---|
| FLOOR SPECIFICATION | NONE (ALL FLOORS) | 8F REGULAR ROOM<br><br>9F REGULAR ROOM | 6F SHOWROOM | NONE (ALL FLOORS) | SATELITE ROOM | VALIDATION ROOM<br><br>MEETING ROOM A<br><br>5F REGULAR ROOM |

FIG. 4E

| SWITCHING CONDITION TYPE TO ALTENATIVE RULE | DEPART SPECIFIED PLACE | ARRIVE AT SPECIFIED PLACE | LEAVE SPECIFIED FLOOR |
|---|---|---|---|
| RETURN CONDITION TYPE TO BASIC RULE | DEPART SPECIFIED PLACE | ARRIVE AT SPECIFIED PLACE | LEAVE SPECIFIED FLOOR |

FIG. 4F

| TIMING (AFTER DETECTING CONDITION) | IMMEDIATELY AFTER DETECTING DEPARTURE/ARRIVAL | AFTER PREDETERMINED TIME PASSES X MINUTES AFTER | SPECIFIED TIME XX:XX |
|---|---|---|---|

| USER NAME | IC CARD | IDENTIFICATION NUMBER |
|---|---|---|
| A | IC-A | 1928343 |
| B | IC-B | 2938757 |
| C | IC-D | 8907345 |
| ... | ... | ... |

FIG. 7

DOCUMENT PROCESSING APPARATUS, DOCUMENT PROCESSING METHOD, DOCUMENT PROCESSING SYSTEM, AND COMPUTER READABLE MEDIUM FOR TRANSMITTING DOCUMENT INFORMATION ACCORDING TO A RULE SELECTED ON THE BASIS OF POSITION INFORMATION

CROSS-REFERENCE TO RELATED APPLICATION

This application is based on and claims priority under 35 USC 119 from Japanese Patent Application No. 2009-146504 filed on Jun. 19, 2009.

BACKGROUND (i) Technical Field

The present invention relates to a document processing apparatus, a document processing method, a document processing system, and a computer readable medium.

(ii) Related Art

There has been conventionally known an image forming apparatus capable of making another image forming apparatus, which is located at a meeting space where the meeting takes place, form images used in the meeting.

SUMMARY

According to an aspect of the present invention, there is provided a document processing apparatus including: an acquisition unit that acquires position information that represents a position of a user who uses a document, and document information that represents the document; a rule management unit that manages a rule to determine a destination of the document information and a process executed to the document information transmitted to the destination; an execution unit that executes the process that includes a process to transmit the document information that the acquisition unit acquires to the destination determined by the rule according to the rule that the rule management unit manages, and is determined by the rule; and a switching unit that switches the rule that the execution unit follows, on the basis of a change of the position information that the acquisition unit acquires.

BRIEF DESCRIPTION OF THE DRAWINGS

Exemplary embodiments of the present invention will be described in detail based on the following figures, wherein.

DETAILED DESCRIPTION

A description will now be given, with reference to the accompanying drawings, of exemplary embodiments of the present invention.

First Exemplary Embodiment

Figure 1A:
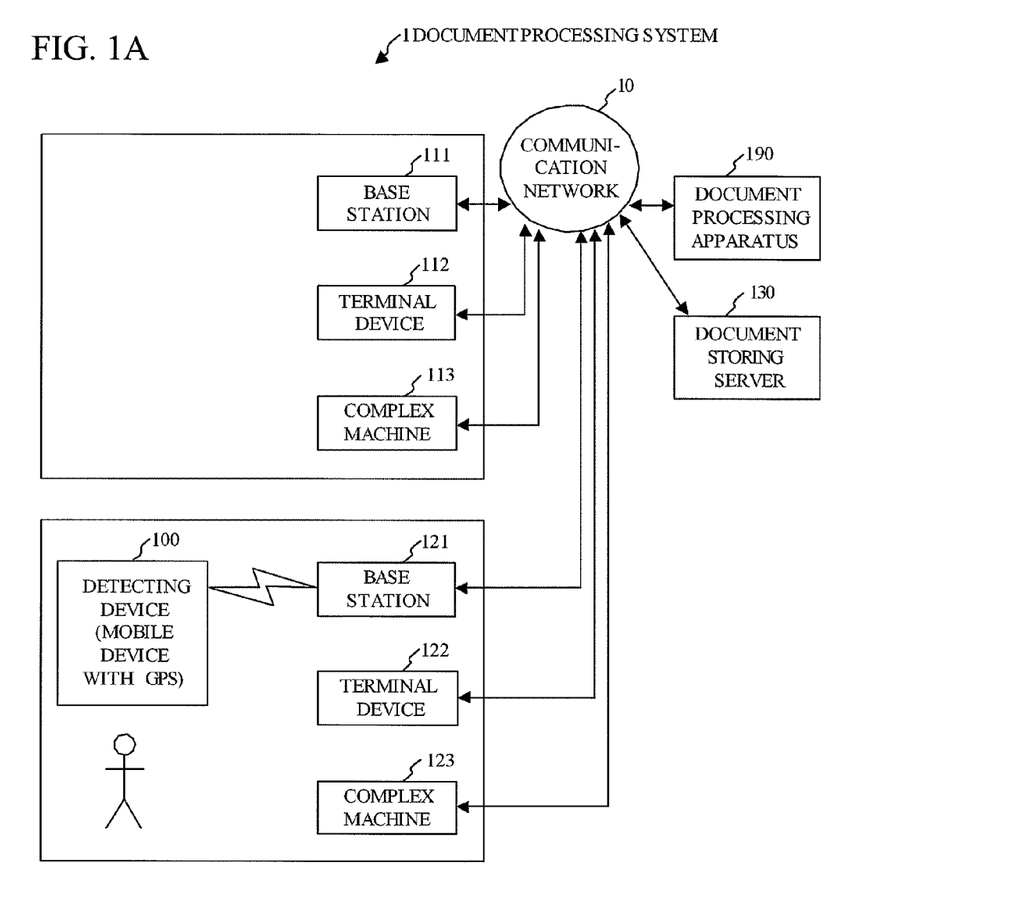
FIGS. 1A and 1B are system block diagrams illustrating an exemplary embodiment of a document processing system including a document processing apparatus of the present invention.

FIG. 1A is a block diagram illustrating an exemplary embodiment of a document processing system including a document processing apparatus of the present invention.

Here, the document processing system is a system that performs a document process. The document process is a job process of which a process object is document information representing a document.

The job process means a procedure of a set of and multiple jobs predetermined. Here, the job is a process or a group of processes that a computer executes to implement predetermined functions. In addition, the procedure of jobs is defined by an execution sequence of jobs and a cooperation method of jobs. A transfer method between process object data used in executed and unexecuted jobs, and variable values related to the process can be cited as a concrete example of the cooperation method of jobs. Executing the job process means executing jobs according to the job process.

An analysis job, a process job, a transmission job, and the like can be cited as a concrete example of jobs.

The analysis job includes a process to extract a variety of information from document information, for example. The process to extract a variety of information from the document information includes a process to extract character information representing characters, which are written in a document, such as a document name, from document image data that the document information represents, by OCR (Optical Character Read) process, for example. The process to extract information from document information is not limited to this, and can include a process to extract information representing a destination of the document by analyzing a one-dimensional code image data such as a bar-code or a two-dimensional code image data such as a QR (Quick Response) code that the document information represents.

The process job includes a process to process the document information. The process to process the document information includes, for example, a process to correct a tilt of a document image that the document information represents, a process to erect a document image that the document information represents, a process to convert a format of the document information, a process to encrypt the document information, a process to embed digital watermark in document image data that the document information represents, and a process to shield confidential matters from the document that the document information represents.

The transmission job includes a process to transmit the document information. The process to transmit the document information includes a process to output the document information. The process to transmit or output the document information includes a process to send the document information or the information extracted from the document information, to e-mail or FAX (facsimile) respectively, a file transfer process of the document information or the information extracted from the document information, and a process to output the document information or the information extracted from the document information, to a printer.

A document processing system 1 illustrated in FIG. 1A is provided with a communication network 10, a detecting device 100, base stations 111 and 121, terminal devices 112 and 122, complex machines 113 and 123, a document storing server 130, and a document processing apparatus 190.

The communication network 10 may be built with LAN (Local Area Network), WAN (Wide Area Network), MAN (Metropolitan Area Network), or a public telephone network, for example. The communication network 10 may be built with Internet or an intranet, for example.

The detecting device 100 is composed of a mobile device on which a GPS (Global Positioning System) is mounted, for example. The mobile device includes a mobile phone unit, and a PHS (Personal Handy-phone System) unit, for example. Thus, the detecting device 100 is carried by a user who uses a document. In addition, after detecting the condition of the user, the detecting device 100 transmits information that relates condition information representing a condition of the detected user to identification information identifying the detecting device 100, to the base station 111 or 121 via radio waves. The condition of the user includes a position of the user. More specifically, the detecting device 100 detects the latitude and longitude of the user. After that, the detecting device 100 relates position information representing a position of the user to the detected latitude and longitude to identification information, and transmits them to the base station 111 or 121.

Figure 1B:
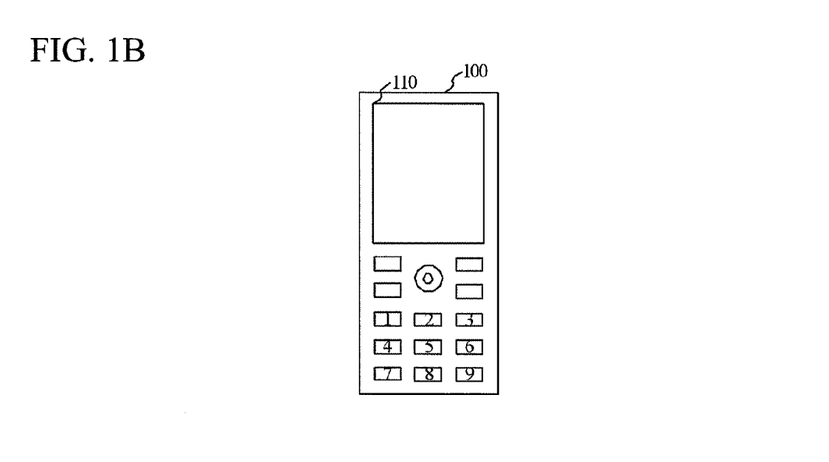

In addition, as illustrated in FIG. 1B, the detecting device 100 is provided with a display 110 composed of, for example, a liquid crystal panel, or an organic EL (Electro-Luminescence). After receiving the document information that is an object of the process of the document processing apparatus 190 through the communication network 10, the detecting device 100 displays the document that the received document information represents on the display 110.

Base stations 111 and 121 communicate a variety of information described above and later, with the detecting device 100 via radio waves. In addition, base stations 111 and 121 communicate information that base stations 111 and 121 communicate or communicated with the detecting device 100, with the document processing apparatus 190 coupled to base stations 111 and 121 via the communication network 10.

Terminal devices 112 and 122 are composed of a personal computer, for example. In the same manner as the detecting device 100, terminal devices 112 and 122 are provided with a display not shown. Displays provided to terminal devices 112 and 122 display a document that the document information represents as well as the display provided to the detecting device 100. A document creation software for creating documents is installed in terminal devices 112 and 122, and document information is generated by execution of the document creation software. Then, terminal devices 112 and 122 input the generated document information to the document processing system 1. More specifically, terminal devices 112 and 122 store the generated document information in a shared directory of the device that the document processing apparatus 190 is able to access for example. The person who orders terminal devices 112 and 122 to store the document information can be same as or different from the user described above.

Complex machines 113 and 123 are composed of a complex machine featuring multiple functions such as a document reading function, a document printing function, a reproducing function, a FAX communication function, and an information communication function, for example. Here, the document reading function is a function to read an original document optically, and generate the document information composed of image data representing the read document. The document printing function is a function to print the document that the document information represents on a print medium such as a print paper, a plastic card, a board, and a fabric for example. The reproducing function is a function to reproduce the document read by the document reading function by printing it with the document printing function. The FAX communication function and the information communication function are functions to receive and transmit the document information with TCP/IP (Transmission Control Protocol/Internet Protocol) or G3 protocol for example.

Complex machines 113 and 123 input the document information generated or received by the document reading function, the FAX communication function, or the information communication function, to the document processing system 1. More specifically, complex machines 113 and 123 store the generated or received document information in a confidential box that the document processing apparatus 190 is able to access. In the same manner as terminal devices 112 and 122, the person who orders complex machines 113 and 123 to store the document information can be same as or different from the user described above.

In addition, complex machines 113 and 123 receive the document information processed by the FAX communication function or the document communication function from the document processing apparatus 190, and print out the received document information with the document printing function.

The terminal device 112 and the complex machine 113 are located, for example, in a same room or a same floor of a same building, where the user carrying the detecting device 100 of which the position is within the wireless communication area of the base station 111 can easily move. The base station 121, the terminal device 122, and the complex machine 123 are located, in the same manner.

The document storing server 130 is composed of a computer device having a document storing function, and a web server function, for example. A document storing function enables to receive document information through the network and store it. A web server function enables to generate access display information to access the stored document information, and transmit it to a device which is a source of access request, in response to the document access request from terminal devices 112 and 122, complex machines 113 and 123, and the detecting device 100 which is the mobile device, which are coupled to the computer via the network. A web server function enables to transmit thumbnail image information, which is reference information of the required document, and a document information file, to the source of request in response to a document reference request and a document acquisition request based on the access display information.

The document processing apparatus 190 is composed of, for example, a server computer device or a personal computer. The document processing apparatus 190 performs a job process determined on the basis of the condition of the user to the document information acquired from the terminal device 112 or 122, or the complex machine 113 or 123. In addition, the document processing apparatus 190 transmits the document information to which the job process is executed, to the destination determined on the basis of the condition of the user. The destination of the document information includes, for example, the detecting device 100 that the user uses, the terminal device 112 or 122 that the user uses, or the complex machine 113 or 123 that the user uses. The destination of the document information is not limited to this, and may include, for example, a mail server or a web server that the user is able to access with the detecting device 100, or the terminal device 112 or 122. Therefore, the destination of the document information is represented, for example, with a directory path of a file system, a mail address, or URL (Unified Resource Locater).

Figure 2A:
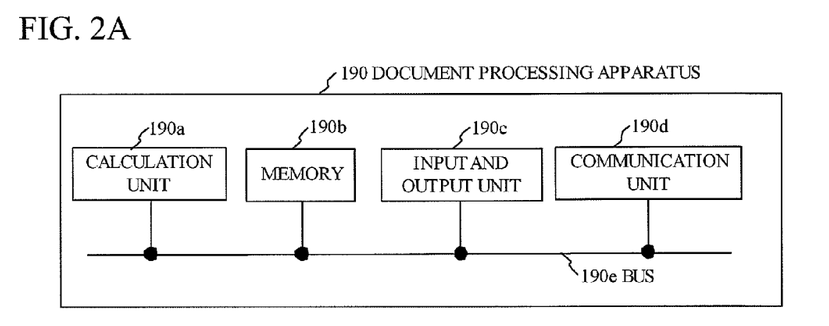
FIGS. 2A and 2B are block diagrams illustrating a composition of the document processing apparatus.

Now, a composition of the document processing apparatus 190 will be described with reference to FIGS. 2A and 2B. FIG. 2A is a hardware block diagram illustrating a composition of the document processing apparatus 190.

The document processing apparatus 190 illustrated in FIG. 2A is provided with a calculation unit 190a, a memory 190b, an input and output unit 190c, and a communication unit 190d. The calculation unit 190a is composed of a CPU (Central Processing Unit) for example. The memory 190b is composed of a ROM (Read-Only Memory), a RAM (Random Access Memory), or a hard disk for example. The input and output unit 190c is composed of an A/D converter for example. The communication unit 190d is composed of a network card, for example. The calculation unit 190a through the communication unit 190d are coupled to each other with a bus 190e so that they are able to transact information.

A software process is implemented in that the calculation unit 190a reads a program stored in the memory 190b and executes calculation according to an execution sequence represented by the read program. Information representing a calculation result is written in the memory 190b by the calculation unit 190a. In addition, as necessary, the input and output unit 190c and the communication unit 190d input and output or communicate information that they input and output or communicate with various units and devices coupled to them as information of the calculation object of the calculation unit 190a and information representing the calculation result.

A composition of the document processing apparatus 190 will be described from the functional side with reference to FIG. 2B. FIG. 2B is a functional block diagram illustrating a composition of the document processing apparatus 190.

Figure 2B:
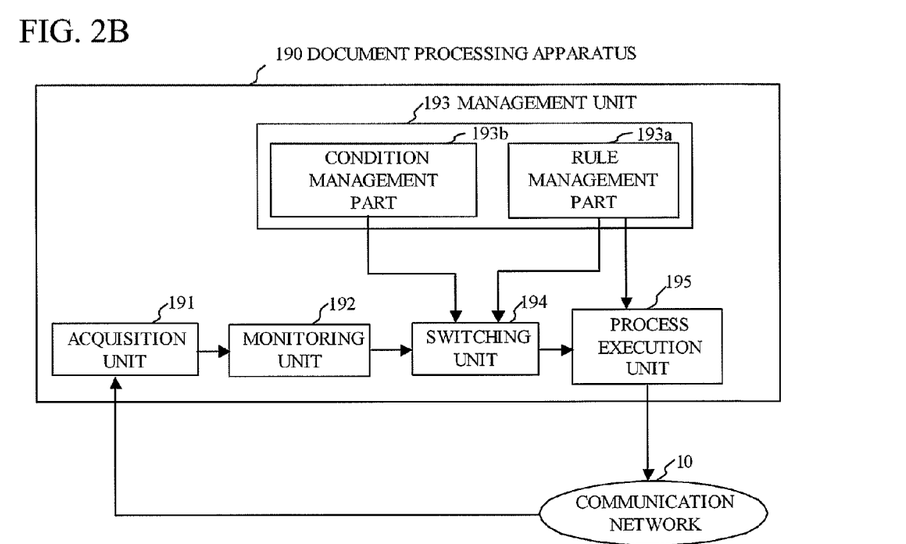

The document processing apparatus 190 illustrated in FIG. 2B is provided with an acquisition unit 191, a monitoring unit 192, a management unit 193, a switching unit 194, and a process execution unit 195. The acquisition unit 191 is implemented in that the calculation unit 190a executes an acquisition process. The acquisition unit 191 acquires the condition information of the user from the base station 111 or 121 through the communication network 10. More specifically, the acquisition unit 191 acquires position information included in the condition information. In addition, the acquisition unit 191 acquires the document information from the terminal device 112 or 122, or the complex machine 113 or 123.

The monitoring unit 192 is implemented in that the calculation unit 190a executes a monitoring process. The monitoring unit 192 monitors the condition of the user represented by the information that the acquisition unit 191 acquires. More specifically, when the condition of the user changes, the monitoring unit 192 reports the change to the switching unit 194. More specifically, the monitoring unit 192 monitors the position of the user represented by the information that the acquisition unit 191 acquires. In addition, when the monitoring position changes, the monitoring unit 192 outputs the change of the position, the position information representing positions before and after the change, and the identification information of the mobile device (the detecting device 100) that the user of which the position changes carries, to the switching unit 194.

The management unit 193 is implemented in that the calculation unit 190a executes the management process. The management unit 193 manages information that the memory 190b stores. More specifically, the management unit 193 is provided with a rule management part (a rule management unit) 193a and a condition management part (a condition management unit) 193b.

The rule management part 193a is implemented in that the calculation unit 190a executes a rule management process included in the management process. The rule management part 193a manages rules that the memory 190b stores.

Figure 3:
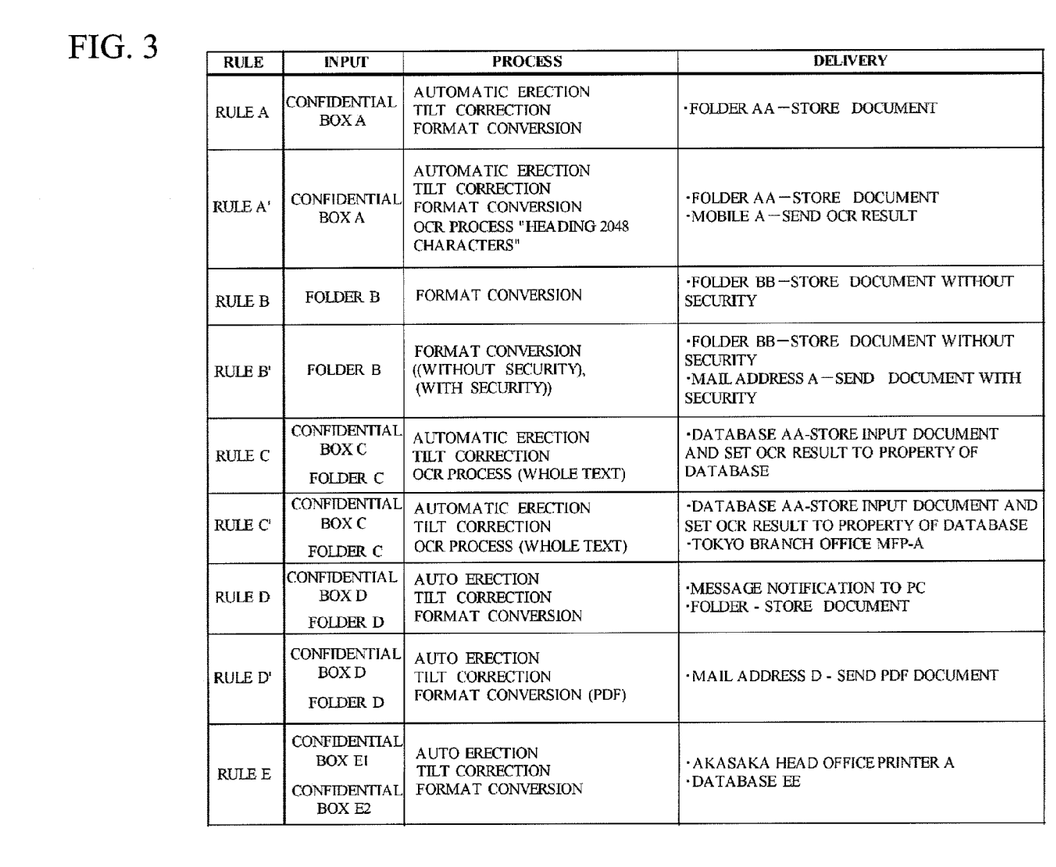
FIG. 3 is a diagram illustrating examples of rules that a rule management part manages.

Now the description will be given of the rule that the rule management part 193a manages with reference to FIG. 3. FIG. 3 is a diagram illustrating examples of rules that the rule management part 193a manages.

The table illustrated in FIG. 3 stores rules to determine the destination of the document information that the user uses, and a set of processes executed to the document information transmitted to the destination. More specifically, this table includes a rule column, an input column, a process column, and a delivery column. The rule column represents a name of the rule. The input column represents an input position of the document information determined by the rule on the same line. The process column represents a set of processes determined to be executed to the document information input in the input position on the same line by the rule on the same line. More specifically, the process column represents contents of the analysis job and the process job, which are included in the set of processes. The delivery column represents a content of the delivery job that the rule on the same line determines for the document information to which the analysis job or the process job on the same line is executed. The content of the transmission job is represented by a transmission object and a destination.

The composition of the document processing apparatus 190 will be described again with reference to FIG. 2B.

The condition management part 193b is implemented in that the calculation unit 190a executes a condition management process included in the management process. The condition management part 193b manages a switching condition and a return condition that the memory 190b stores. A switching condition is a group of conditions to switch a rule that the process execution unit 195 follows to another rule, and a return condition is a group of conditions to return a rule that the process execution unit 195 follows from the rule after being switched to the rule before being switched.

Figure 4A:
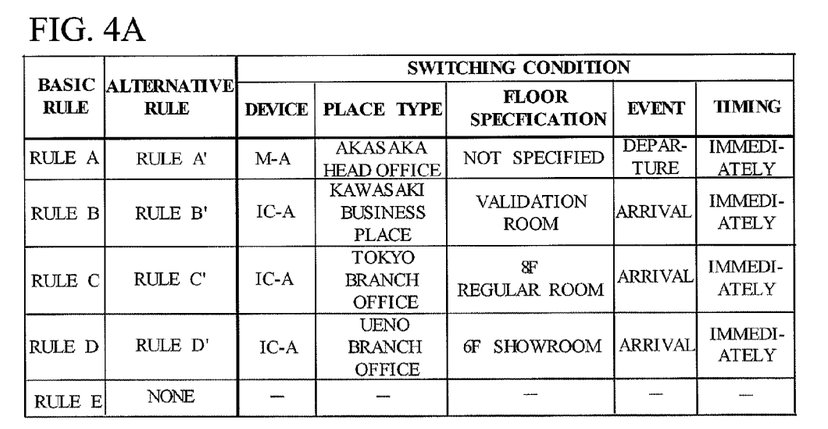
FIGS. 4A through 4F are diagrams illustrating examples of switching conditions that a condition management part manages.
Figure 4B:
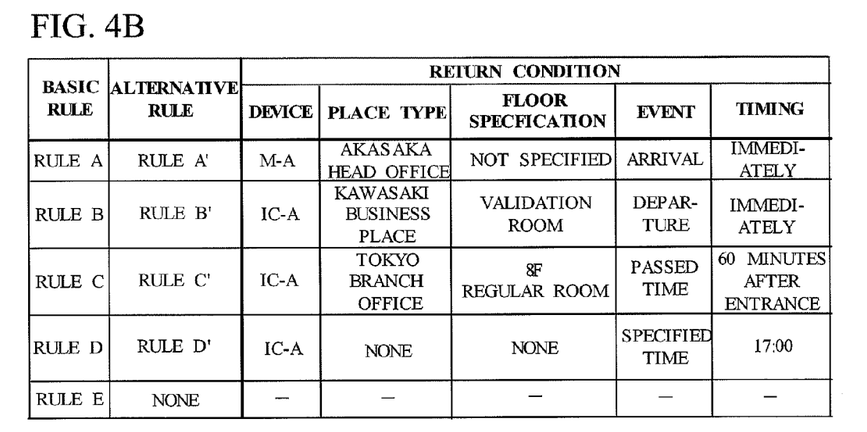
Figure 4C:
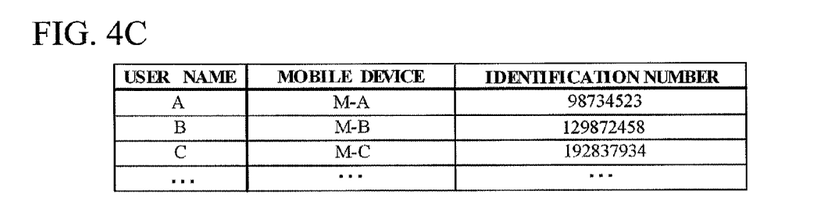
Figure 4D:
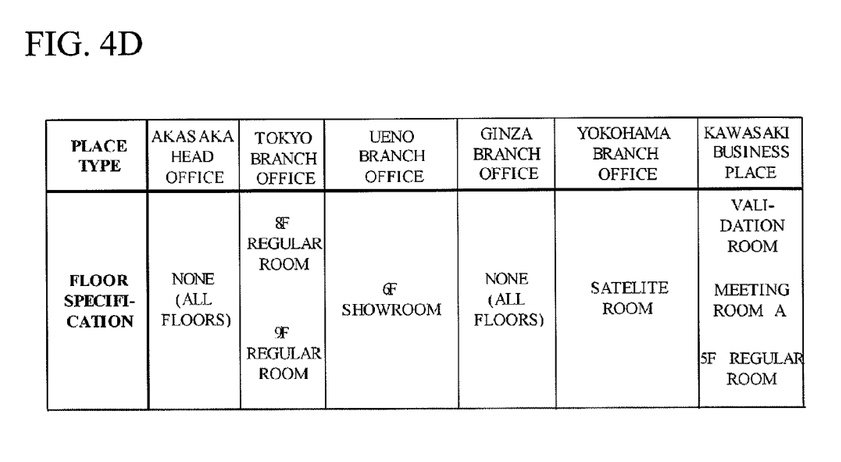
Figure 4E:
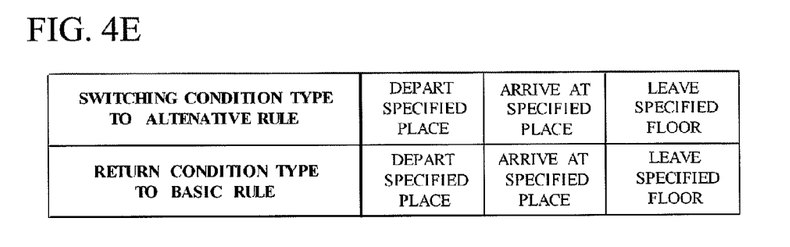
Figure 4F:
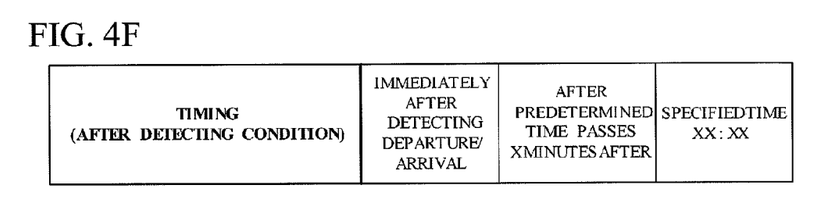

A description will now be given of the switching condition and the return condition that the condition management part 193b manages, with reference to FIGS. 4A and 4B. FIG. 4A is a diagram illustrating examples of the switching condition that the condition management part 193b manages. FIG. 4B is a diagram illustrating examples of the return condition that the condition management part 193b manages. Tables illustrated in FIGS. 4A and 4B are stored in the memory 190b.

The table in FIG. 4A relates a rule before being switched, a rule after being switched, and the switching condition to each other, and stores them. The table in FIG. 4B relates a rule before being switched, a rule after being switched, and the return condition to each other, and stores them.

More specifically, the table in FIG. 4A includes a basic rule column, an alternative rule column, and a switching condition column. The basic rule column and the alternative rule column represents names of the basic rule and the alternative rule. The switching condition column represents the switching condition to switch the rule that the process execution unit 195 follows from the basic rule to the alternative rule on the same line. The basic rule is a rule that the process execution unit 195 follows basically. The rule followed basically is a rule that the process execution unit 195 follows during a time from startup till when the return condition is met, and during a time from when the return condition is met till when the switching condition is met again, for example. The alternative rule is a rule that the process execution unit 195 follows as an alternative to the basic rule. More specifically, the alternative rule is a rule that the process execution unit 195 follows during a time from when the switching condition is met till when the return condition is met.

The table in FIG. 4B includes a basic rule column, an alternative rule column, and a return condition column. The basic rule column and the alternative rule column are same as the basic rule column and the alternative rule column in FIG. 4A, respectively. The return condition column represents the return condition to return the rule that the process execution unit 195 follows from the alternative rule to the basic rule on the same line.

The switching condition is met when the predetermined time passes after the predetermined change of the condition of the user who uses the destination determined by the rules before and after being switched or the condition of the mobile device that the user carries, occurs, for example. In the same manner, the return condition is met when the predetermined time passes after the predetermined change of the condition of the user who uses the destination determined by the rules before and after being returned or the condition of the mobile device that the user carries, occurs, for example.

Here, the predetermined change of the condition includes the change from the condition that the predetermined event does not occur to the condition that it occurs. More specifically, the predetermined change of the condition includes, for example, the change from the condition before the predetermined time such as "17:00" to the condition after the predetermined time.

In addition, the predetermined change of the condition includes the change from the condition the predetermined event does not occur to the condition it occurs at the predetermined place, for example. More specifically, the predetermined change of the condition includes arriving at the predetermined place, staying at the predetermined place till the predetermined time passes, or departing the predetermined place.

The switching condition column in FIG. 4A and the return condition column in FIG. 4B include a device column, a place type column, a floor specification column, an event column, and a timing column. The device column represents identification information of the mobile device (the detecting device 100) carried by the user who uses the destination determined by the basic rule and the alternative rule on the same line. The place type column represents the type of a place where the user carrying mobile device identified by the information on the same line arrives at, stays at, and departs. Here, the place type includes the type of building, for example. The type of building is categorized based on the intended use of building such as a head office, a branch office, and a business place, and an area name where the building is built. The floor specification column represents a floor that the user arrives at or departs as well as the place type column. The event column represents the event that can occur at the floor of the place lying in the place type column on the same line. The event that can occur at the floor is represented by actions such as "arrival", which the user carrying the mobile device can take. The timing column represents timing when the condition is met after the user takes the action on the same line. More specifically, timing is represented by the elapsed time from when the user takes the action on the same line till when the condition is met. Therefore, concrete examples of the switching condition and the return condition can be the condition met immediately after the user's arrival or departure, and the condition met after sixty minutes passes after the user's arrival or entrance. "Immediately" means a predetermined time set short enough compared to the user's traveling time. The time that is enough short compared to the user's traveling time includes time such as several seconds.

Tables from FIG. 4C to FIG. 4F are tables to determine information that the switching condition column in FIG. 4A and the return condition column in FIG. 4B can represent (that are to say master tables). The table in FIG. 4C includes a user name column, a mobile device column, and an identification number column. The user name column represents the name of the user carrying the mobile device. The mobile device column and the identification number column are the type and the identification number of the mobile device that the user on the same line carries, and represents the type and the identification number stored in tables in FIGS. 4A and 4B. In addition, the table in FIG. 4D includes a place type line and a floor specification line. The place type line represents a place type stored in tables in FIGS. 4A and 4B. The floor specification line represents floors stored in tables FIGS. 4A and 4B when the place type represented on the same column is stored in tables in FIGS. 4A and 4B. The table in FIG. 4E includes a switching condition type to the alternative rule line, and a return condition type to the return rule line. The switching condition type to the alternative rule line represents events stored in tables in FIGS. 4A and 4B. The table in FIG. 4F includes a timing column representing timing stored in tables in FIGS. 4A and 4B.

The composition of the document processing apparatus 190 will be described, with reference to FIG. 2B.

The switching unit 194 is implemented in that the calculation unit 190*a* executes a switching process. The switching unit 194 switches the rule that the process execution unit 195 follows to the rule to determine the destination that the user of which the condition changes uses, on the basis of the condition of the user that the monitoring unit 192 monitors. Here, the condition of the user includes a position of the user. Thus, the switching unit 194 switches the rule that the process execution unit 195 follows to the rule to determine the destination that the user who is in the place represented by the position information after the change uses, on the basis of the change of the position information that the acquisition unit 191 acquires.

More specifically, the switching unit 194 determines whether the switching condition or the return condition is met, on the basis of the change of the condition information that the monitoring unit 192 monitors. When the switching unit 194 determines that the switching condition is met, the switching unit 194 switches the rule that the process execution unit 195 follows to the alternative rule that the condition management part 193*b* manages in relation to the switching condition that the switching unit 194 determines to be met. When the switching unit 194 determines that the return condition is met, the switching unit 194 switches the rule that the process execution unit 195 follows to the basic rule that the condition management part 193*b* manages in relation to the return condition that the switching unit 194 determines to be met.

The process of the switching unit 194 will be described more concretely, with reference to FIGS. 4A through 4F.

The switching unit 194 acquires the change of the position information of the mobile device, the position information before and after the change, and the identification information of the mobile device from the monitoring unit 192. Then, the switching unit 194 determines the type of mobile device that the acquired identification information identifies, among the types of the mobile device stored in the table of FIG. 4C. The switching unit 194 determines the place type and the floor of the place where the user was before and after the user changes the position, among place types and floors stored in the table of FIG. 4D, on the basis of the position of the user that the position information before and after the change represents. In addition, the switching unit 194 determines the event that the user creates, among events stored in the table of FIG. 4E, on the basis of the position of the user that the information before and after the change represents. After that, the switching unit 194 determines the switching condition that meets the determined mobile device type, the determined place type, the determined floor, and the determined event, among conditions stored in the table of FIG. 4A. When the switching unit 194 determines the switching condition, it acquires the information representing timing related to the detected switching condition. Then the switching unit 194 switches the rule that the process execution unit 195 follows from the basic rule related to the switching condition to the alternative rule related to the switching condition at timing that the acquired information represents. In the same manner, the switching unit 194 determines the return condition among conditions stored in the table of FIG. 4B, and when it can determine the return condition, it switches the rule that the process execution unit 195 follows from the determined alternative rule to the determined basic rule at timing related to the determined return condition.

A description will now be given of the process of the switching unit 194 with a concrete example.

A description will be given of the case that the switching unit 194 detects the event that the user carrying the mobile device of which the type is "M-A" "departs" the place type "Akasaka head office", on the basis of the information acquired from the monitoring unit 192.

The switching unit 194 determines that the switching condition represented on the first line of the table in FIG. 4A is met on the basis of the detection result. Therefore, the switching unit 194 switches the basic rule "Rule A" that the process execution unit 195 follows to the alternative rule "Rule A'" "immediately".

When document information is input to the "confidential box A" after the user carrying the mobile device of which the type is "M-A" "departs" the place type "Akasaka head office", which means the user goes out to the outside of "Akasaka head office", the process execution unit 195 executes processes such as the process to erect the document that the document information represents (hereinafter, called an automatic erection process) and the process to "extract heading 2048 characters from character information extracted by an OCR process", to the document information input in the "confidential box A", according to the rule "Rule A'" represented on the second line of the table in FIG. 3. After that, the process execution unit 195 stores the document information, to which the processing process is executed, to the "folder AA" of the terminal device 112 or 122, or the complex machine 113 or 123 in Akasaka head office, and delivers information of the OCR result to the mobile device, of which the type is "M-A", of the user who departed Akasaka head office.

The user carrying the mobile device of which the type is "mobile A" can see the OCR result information received with the mobile device even when the user is away from the office. However, there is the case that the user wants to see or acquire the document information more than the 2048 characters information received. Therefore, the process execution unit 195 may transmit the document information, to which the processing process is executed, to the document storing server 130 coupled to it via the network, and deliver the information about the stored location of the document information such as URL (Uniform Resource Locator) information to the mobile device, of which the type is "M-A", of the user together with the OCR result information. When the user wants to see the document information, the user may see and acquire the document information by accessing to the document storing server 130 according to the delivered information about the stored location.

A description will now be given of the case that the switching unit 194 detects the event that the user carrying the mobile device of which the type is "M-A" "arrives" at the place type "Akasaka head office".

The switching unit 194 determines that the switching condition represented on the first line of the table in FIG. 4B is met, on the basis of the detection result. Therefore, the switching unit 194 switches the alternative rule "Rule A'" that the process execution unit 195 follows to the basic rule "Rule A" "immediately".

When the document information is input to the "confidential box A" after the user carrying the mobile device of which the type is "M-A" "arrives" at the place type "Akasaka head office", which means the user comes back to "Akasaka head office", the process execution unit 195 executes the automatic erection process etc. to the document information in the "confidential box A" according to the rule "Rule A" represented on the first line of the table in FIG. 3. After that, the process execution unit 195 delivers the processed document information to the "Folder AA" of the terminal device 112 or 122, or the complex machine 113 or 123, which the user who arrives at Akasaka head office uses.

The process execution unit 195 may control the document storing server 130 to delete the document information which is processed and stored in the document storing server 130 according to the "Rule A". This is because the user does not need to see or acquire the document information from outside of the office as the user carrying the mobile device of which the type is "M-A" "arrives" at the place type "Akasaka head office", which means the user comes back to "Akasaka head office".

The composition of the document processing apparatus 190 will be described again, with reference to FIG. 2B.

The process execution unit 195 is implemented in that the calculation unit 190*a* executes a process execution process. The process execution unit 195 executes the previous process that the rule determines, to the document information that the acquisition unit 191 acquires, according to the rule switched by the switching unit 194. After that, the process execution unit 195 executes a transmission process to transmit the document information to which the process is executed, to the destination that the switched rule determines. The previous process is the process determined to be executed previous to the transmission process by the rule that the management unit 193 manages. In addition, the previous process is the process determined to be executed to the document information transmitted to the destination that the switched rule determines by the switched rule. More specifically, the previous process is included in the part determined to be executed previous to the transmission job, of the job process determined to be executed by the rule. Briefly, the previous process is included in one or more of the analysis job and the process job above, and the transmission process is included in the transmission job above.

A processing process to ensure the security to the document information in accordance with the security strength of the destination can be cited as a concrete example of the process previous to the transmission process. When the destination is the mobile device, this processing process to ensure the security includes a process to convert the document information to the information representing the document with only parts not defined as confidential, and selected from the document. Here, the possibility that the detecting device 100 is lost or stolen is high compared to the possibility that terminal devices 112 and 122 and complex machines 113 and 123 (hereinafter, called the terminal device 112 etc.), which are not carried, are lost or stolen. Therefore, it can be said that the security strength of the mobile device is weaker than the security strength of the terminal device 112 etc. Therefore, when the destination is the mobile device, the process execution unit 195 ensures the high security to the document information by selecting only parts not defined as confidential compared to the case that the process execution unit 195 does not select parts not defined as confidential.

In addition, this processing process to ensure the security includes a process to encrypt the document information when there is a possibility of sniffing on the transmission path to the destination. More specifically, when the device and apparatus of the destination is coupled to the document processing apparatus 190 via the intranet, the possibility for the document information to be sniffed is high compared to the case it is coupled to with only unique network protocol. Therefore, when the destination is a mobile device, the process execution unit 195 selects only parts not defined as confidential, so that the process execution unit 195 ensures the high security to the document information compared to the case the process execution unit 195 does not select. Thus, when the destination is a device or an apparatus to be coupled to via the intranet, the process execution unit 195 encrypts the document information so that the process execution unit 195 ensures the high security to the document information compared to the case that the process execution unit 195 does not encrypt.

A processing process that processes the document information into the format that the electronic apparatus of the destination can process can be cited as another concrete example of the previous process. More specifically, when the destination of the document information is the detecting device 100 composed of the mobile device, the processing process to change the format includes a process to reduce (or enlarge) the size of document that the document information represents, on the basis of the size of the display 110 provided to the detecting device 100. In addition, this processing process to change the format includes a process to change the format of the document information (briefly, the file format) to a format that the mobile device can process when the destination is the mobile device. Furthermore, this processing process to change the format includes a process to change the property of the document information to the property that the complex machine 113 or 123 can use when printing the document that the document information represents, when the destination of the document information is the complex machine 113 or 123. Here, the property of the document information includes the property representing the size of the print medium on which the document that the document information represents is printed, or the property representing the number of pages printed on a single print medium.

Figure 5:
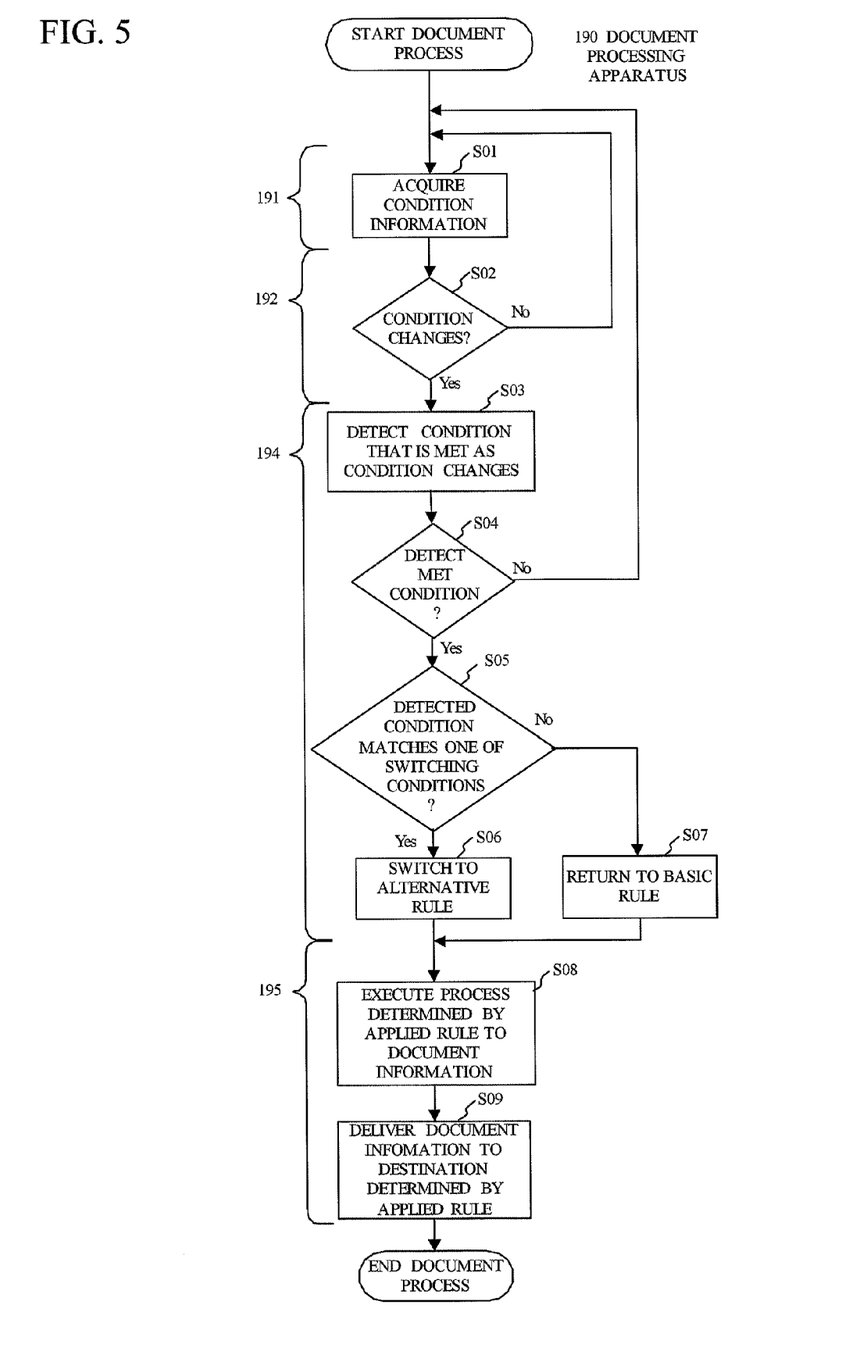
FIG. 5 is a flowchart illustrating a document process that the document processing apparatus executes.

A process that the document processing apparatus 190 executes will be described with reference to FIG. 5. FIG. 5 is a flowchart illustrating a document process that the document processing apparatus 190 executes.

The document processing apparatus 190 acquires condition information from the base station 111 or 121 through the communication network 10 (step S01). Then, the document processing apparatus 190 monitors the change of the condition that the acquired condition information represents. In addition, the document processing apparatus 190 determines whether the condition that the document processing apparatus 190 monitors changes (step S02). When the document processing apparatus 190 determines that the condition changes, it executes the procedure of a step S03. When the document processing apparatus 190 determines that the condition does not change, it goes back to the step S01, and repeats the procedure above.

When the document processing apparatus 190 determines that the condition changes in the step S02, it detects the condition that is met as the condition has changed (step S03). Then, the document processing apparatus 190 determines whether the met condition is detected (step S04). When the document processing apparatus 190 determines that the met condition is detected, it executes the procedure of a step S05. When the document processing apparatus 190 determines that the met condition is not detected, it goes back to the step S01, and repeats the procedure above.

When the document processing apparatus 190 determines that the condition is detected in the step S04, it determines whether the detected condition (hereinafter, it will be also called a detected rule) matches one of switching conditions (step S05). When the document processing apparatus 190 determines that the detected condition matches one of switching conditions, it executes a procedure of the step S06. When the document processing apparatus 190 determines that the detected condition does not match one of switching conditions, it executes the procedure of the step S07.

When the document processing apparatus 190 determines that the detected condition matches one of switching conditions in the step S05, it returns the rule that determines the process to be executed from the basic rule to the alternative rule (step S06).

When the document processing apparatus 190 determines that the detected condition does not match one of switching conditions, it switches the rule that determines the process to be executed from the alternative rule to the basic rule (step S07). Here the rule after being switched or the rule after being returned is called an applied rule.

After executing steps S06 and S07, the document processing apparatus 190 executes the process that the applied rule determines to the document information (step S08). Then, the document processing apparatus 190 delivers the document information to which the process is executed to the destination that the applied rule determines (step S09). After that, the document processing apparatus 190 ends the execution of the document process.

In FIG. 5, the procedure of the step S01 corresponds to an example of the acquisition process to implement the acquisition unit 191, the procedure of the step S02 corresponds to an example of the monitoring process to implement the monitoring unit 192, the procedures of steps S03 to S07 correspond to an example of the switching process to implement the switching unit 194, and the procedures of steps S08 and S09 correspond to the process execution process to implement the process execution unit 195.

Second Exemplary Embodiment

Figure 6A:
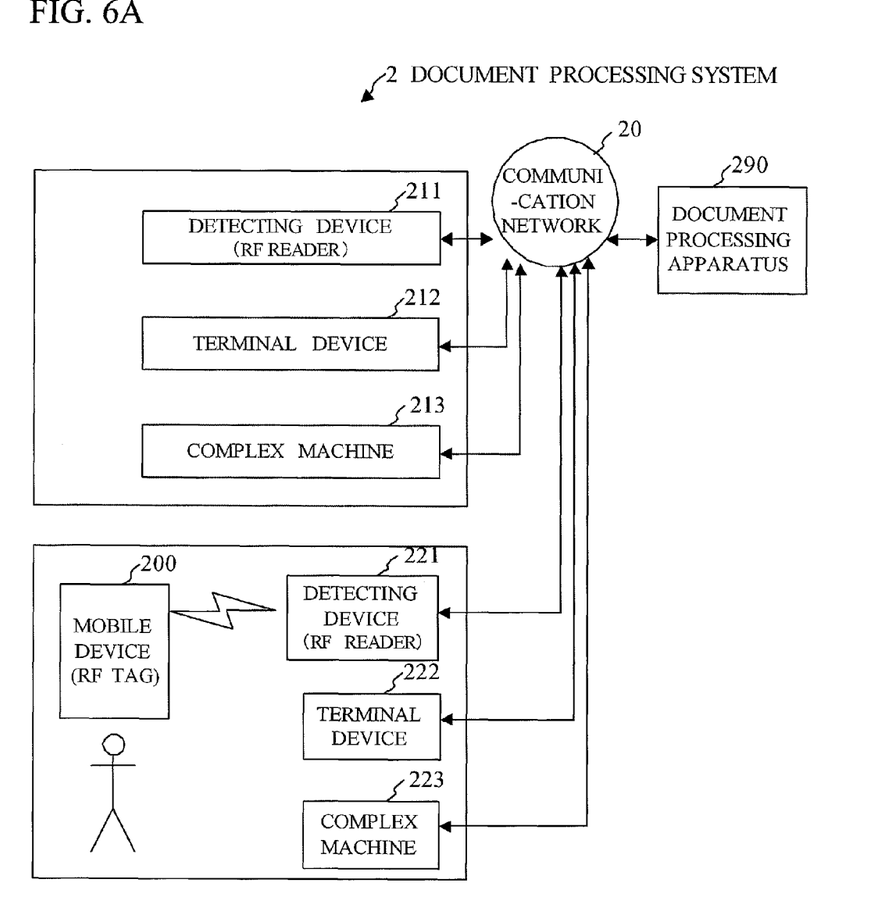
FIGS. 6A and 6B are system block diagrams illustrating a document processing system in accordance with the second exemplary embodiment.
Figure 6B:
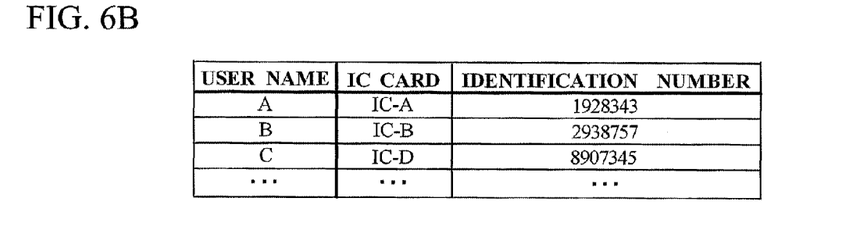

A description will now be given of a composition of a document processing system in accordance with the second exemplary embodiment with reference to FIGS. 6A and 6B. FIG. 6A is a diagram illustrating a composition of the document processing system in accordance with the second exemplary embodiment.

A document processing system 2 illustrated in FIG. 6A is composed of a communication network 20, a mobile device 200, detecting devices 211 and 221, terminal devices 212 and 222, complex machines 213 and 223, and a document processing apparatus 290. The communication network 20 is same as the communication network 10 described in the first exemplary embodiment. Therefore, the description of the communication network 20 is omitted.

The mobile device 200 is almost same as the detecting device 100 described in the first exemplary embodiment. Therefore, a description will be given of differences mainly. The mobile device 200 is an IC (Integrated Circuit) card or a mobile terminal provided with an RF (Radio Frequency) tag, for example. Unlike the detecting device 100, the mobile device 200 does not have the function to detect the condition of the user. However, the mobile device 200 transmits the identification information to identify the mobile device 200 to detecting devices 211 and 221 via radio waves as well as the detecting device 100.

Detecting devices 211 and 221 are composed of an RFID (Radio Frequency IDentification) reader for example. Detecting devices 211 and 221 communicate the identification information of the mobile device 200 with the mobile device 200 via radio waves. In addition, detecting devices 211 and 221 detect the position of the user carrying the mobile device 200. More specifically, detecting devices 211 and 221 preliminarily memorize positions in which detecting devices 211 and 221 are located, and detect the position of the user carrying the mobile device 200 as the position preliminarily memorized, when receiving the identification information from the mobile device 200. After that, detecting devices 211 and 221 communicate the information that relates the detected position information of the user to the received identification information with the document processing apparatus 290.

Detecting devices 211 and 221 may manage entering and leaving the predetermined room of the user using the mobile device 200. More specifically, the detecting device 211 may unlock an entrance of the predetermined room when receiving the identification information from the mobile device 200, and may lock the entrance of the room when receiving the identification information after that. Furthermore, the detecting device 211 may detect entering (arrival) and leaving (departure) of the user, relate the entering and leaving information representing the detected entering and leaving to the position information and the identification information, and transmit them to the document processing apparatus 290 by wired connections.

Terminal devices 212 and 222, and complex machines 213 and 223 are same as terminal devices 112 and 122, and complex machines 113 and 123 in the first exemplary embodiment. Therefore, descriptions of terminal devices 212 and 222, and complex machines 213 and 223 are omitted. The detecting device 211, the terminal device 212, and the complex machine 213 are located in a same room or a same floor of a same building for example, where the user can easily goes back and forth between each device and apparatus. The detecting device 221, the terminal device 222, and the complex machine 223 are located, in the same manner.

The document processing apparatus 290 is almost same as the document processing apparatus 190 described in the first exemplary embodiment. However, the document processing apparatus 290 stores a table illustrated in FIG. 6B instead of the table illustrated in FIG. 4C. The table in FIG. 6B includes a user name column, an IC card column, and an identification number column. The user name column and the identification number column in FIG. 6B are same as the user name column and the identification number column in FIG. 4C. The IC card column represents the type of the mobile device 200 carried by the user on the same line.

Third Exemplary Embodiment

Figure 7:
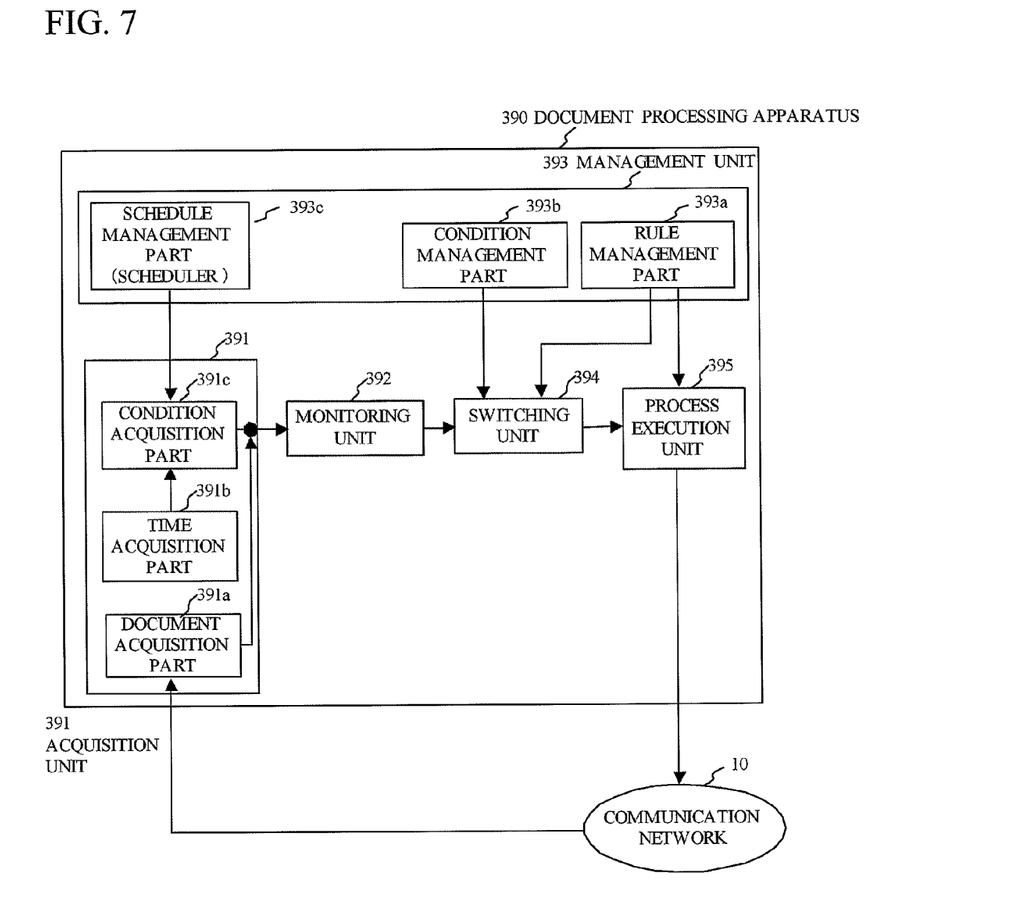
FIG. 7 is a functional block diagram illustrating a composition of a document processing apparatus in accordance with the third exemplary embodiment.

A description will be given of a composition of a document processing apparatus in accordance with the third exemplary embodiment with reference to FIG. 7. FIG. 7 is a functional block diagram illustrating a composition of the document processing apparatus in accordance with the third exemplary embodiment.

A document processing apparatus 390 illustrated in FIG. 7 is provided with an acquisition unit 391, a monitoring unit 392, a management unit 393, a switching unit 394 and a process execution unit 395 as well as the document processing apparatus 190 in the first exemplary embodiment.

A description will be given of the monitoring unit 392 through the process execution unit 395 before a description of the acquisition unit 391.

The monitoring unit 392, the switching unit 394, and the process execution unit 395 are almost same as the monitoring unit 192, the switching unit 194, and the process execution unit 195 in the first exemplary embodiment. Therefore, descriptions of the monitoring unit 392, the switching unit 394, and the process execution unit 395 are omitted.

The management unit 393 is provided with a rule management part 393a, a condition management part 393b, and a schedule management part (a schedule management unit) 393c. The rule management part 393a and the condition management part 393b are almost same as the rule management part 193a and the condition management part 193b in the first exemplary embodiment. Therefore, descriptions of the rule management part 393a and the condition management part 393b are omitted.

The schedule management part 393c is implemented in that the calculation unit 190a executes the schedule management process included in the management process. The schedule management part 393c manages the schedule of the user who uses the document processing apparatus 390. More specifically, the schedule management part 393c is composed of a schedule management tool or an attendance management tool for example. The schedule management part 393c relates identification information to identify the user, time information representing the time, and schedule information to predetermine the condition of the user at the time that the time information determines to each other, and manages them. The condition of the user includes not only the user position but also the condition that the user cannot operate the mobile device because of the attendance to the meeting, or the condition that the user can use the mobile device, for example.

The acquisition unit 391 is almost same as the acquisition unit 191 in the first exemplary embodiment. Therefore a description will be given of differences mainly. The acquisition unit 391 is provided with a document acquisition part 391a, a time acquisition part 391b, and a condition acquisition part 391c.

The document acquisition part 391a is implemented in that the document processing apparatus 390 executes the document acquisition process. The document acquisition part 391a acquires the document information that is the object of the document process as well as the acquisition unit 191 in the first exemplary embodiment.

The time acquisition part 391b is implemented in that the document processing apparatus 390 executes the time acquisition process. The time acquisition part 391b acquires time information representing the time. More specifically, the time acquisition part 391b acquires the time information representing the present time (or the time before or after the time predetermined on the basis of one or more of the processing speed of the document processing apparatus 390 and the delivery speed of the document information, from the present time). More specifically, the time acquisition part 391*b* acquires the time information representing the system time, which is the time that the document processing apparatus 390 measures, from a system clock provided to the document processing apparatus 390. The time information that the time acquisition part 391*b* acquires may be the time before or after the predetermined time from the present time.

The condition acquisition part 391*c* is implemented in that the document processing apparatus 390 executes the condition acquisition process. The condition acquisition part 391*c* acquires the position information representing the position of the user of the document processing apparatus 390 from the time information that the time acquisition part 391*b* acquires and schedule information that the schedule management part 393*c* manages. More specifically, the condition acquisition part 391*c* acquires the condition information representing the condition of the user at the time that the time information represents and the identification information of the user from the schedule information that the schedule management part 393*c* manages on the basis of the time information that the time acquisition part 391*b* acquires. Here, as described above, the condition information includes the position information representing the position. Therefore, more specifically, the condition acquisition part 391*c* searches the schedule information that the schedule management part 393*c* relates to the time information representing the system time and manages, and acquires the position information representing the position of the user that the searched schedule information determines. After that, the acquisition unit 391 outputs the information that relates the acquired position information to the user or the identification information of the mobile device carried by the user to the monitoring unit 392.

The first exemplary embodiment through the third exemplary embodiment can be combined respectively without disincentives.

Programs that document processing apparatuses 190 and 390 execute can be supplied by providing a magnetic disk, an optical disk, a semiconductor memory, or other recording media to which the program is stored, or delivering the program via the network.

Furthermore, a part of or all of functions that document processing apparatuses 190, 290, and 390 implement with the execution of the software process can be implemented with the hardware circuit. A part of or all of functions that document processing apparatuses 190, 290, and 390 implement with the hardware circuit can be implemented with the execution of the software process.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various exemplary embodiments and with the various modifications as are suited to the particular use contemplated. It is intended that the scope of the invention be defined by the following claims and their equivalents.

What is claimed is:

1. A document processing apparatus comprising:
   an acquisition unit that acquires position information that represents a position of a user who uses a document, and document information that represents the document;
   a rule management unit that manages a rule that specifies (i) an input location of the document, (ii) a process executed upon the document information corresponding to the document located in the input location, and (iii) a destination location to which the document information is transmitted after the process is executed upon the document information corresponding to the document located in the input location;
   an execution unit that, using a CPU, executes the process determined based on the input location of the document corresponding to the document information acquired by the acquisition unit, upon the document information, and transmits the document information to the destination location specified by the rule, after the process is executed upon the document information, according to the rule that the rule management unit manages; and
   a switching unit that switches the rule that the execution unit follows between at least a first rule and a second rule that specifies a process different from a process executed upon the document information by the first rule, on the basis of a change of the position information that the acquisition unit acquires.

2. The document processing apparatus according to claim 1, further comprising
   a condition management unit that relates the first rule that the execution unit follows before the switching unit switches the rule, the second rule that the execution unit follows after the switching unit switches the rule, and a return condition that causes the switching unit to switch from the second rule back to the first rule, and manages the first rule, the second rule, and the return condition,
   wherein when the switching unit determines that the return condition is met, the switching unit returns the rule that the execution unit follows to the first rule.

3. The document processing apparatus according to claim 1, further comprising
   a schedule management unit that relates time information representing a time to schedule information that specifies a position of the user at a predetermined time that the time information represents, and manages the time information and the schedule information,
   wherein the acquisition unit includes a time acquisition unit that acquires time information, and acquires position information representing the position of the user from the acquired time information and the schedule information that the schedule management unit manages.

4. The document processing apparatus according to claim 1, wherein the process executed upon the document information transmitted to the destination includes a process to ensure a security according to a security strength of the destination for the document information.

5. The document processing apparatus according to claim 1, wherein the process executed upon the document information transmitted to the destination includes processing the document information into a format that an electronic apparatus of the destination is able to process.

6. A non-transitory computer readable medium causing a computer to execute a process, the process comprising:
   acquiring position information representing a position of a user who uses a document, and document information representing the document;
   managing a rule that specifies (i) an input location of the document, (ii) a process executed upon the document information corresponding to the document located in the input location, and (iii) a destination location to which the document information is transmitted after the process is executed upon the document information corresponding to the document located in the input location;

executing the process determined based on the input location of the document corresponding to the acquired document information, upon the acquired document information, and transmitting the acquired document information to the destination location specified by the rule, after the process is executed on the acquired document information, according to the managed rule; and switching the rule followed in executing between at least a first rule and a second rule that specifies a process different from a process executed upon the document information by the first rule, on the basis of a change of the acquired position information.

7. A document processing method comprising:

acquiring position information representing a position of a user who uses a document and document information representing the document;

managing a rule that specifies (i) an input location of the document, (ii) a process executed upon the document information corresponding to the document located in the input location, and (iii) a destination location to which the document information is transmitted after the process is executed upon the document information corresponding to the document located in the input location;

executing, using a CPU, the process determined based on the input location of the document corresponding to the acquired document information, upon the acquired document information, and transmitting the acquired document information to the destination location specified by the rule, after the process is executed on the acquired document information, according to the managed rule; and switching the rule followed when executing between at least a first rule and a second rule that specifies a process different from a process executed upon the document information by the first rule, on the basis of a change of the acquired position information.

8. A document processing system comprising:

a detecting unit that detects a position of a user who uses a document;

an input unit that inputs document information representing the document;

a rule management unit that manages a rule that specifies (i) an input location of the document, (ii) a process executed upon the document information corresponding to the document located in the input location, and (iii) a destination location to which the document information is transmitted after the process is executed upon the document information corresponding to the document located in the input location;

an execution unit that, using a CPU, executes the process determined based on the input location of the document corresponding to the document information input by the input unit, upon the document information, and transmits the document information to the destination location specified by the rule, after the process is executed upon the document information, according to the rule managed by the rule management unit; and a switching unit that switches the rule that the execution unit follows between at least a first rule and a second rule that specifies a process different from a process executed upon the document information by the first rule, on the basis of a change of a position that the detecting unit detects.

9. A document processing system comprising:

a schedule management unit that relates time information representing a time to schedule information that preliminarily determines a position of a user who uses a document at a predetermined time that the time information represents, and manages the time information and the schedule information;

a time information acquisition unit that acquires time information;

an acquisition unit that acquires position information representing a position of the user from the time information acquired by the time information acquisition unit and the schedule information that the schedule management unit manages;

a rule management unit that manages a rule that specifies (i) an input location of the document, (ii) a process executed upon document information representing the document located in the input location, and (iii) a destination location to which the document information is transmitted after the process is executed upon the document information corresponding to the document located in the input location;

an execution unit that, using a CPU, executes the process determined based on the input location of the document corresponding to the document information, upon the document information, and transmits document information to the destination location specified by the rule, after the process is executed upon the document information, according to the rule managed by the rule management unit; and a switching unit that switches the rule that the execution unit follows between at least a first rule and a second rule that specifies a process different from a process executed upon the document information by the first rule, on the basis of a change of the position information that the acquisition unit acquires.

10. The document processing apparatus according to claim 1, wherein the change of the position information that the acquisition unit acquires is a movement from indoors to outdoors or a movement from outdoors to indoors.

11. A document processing apparatus comprising:

an acquisition unit that acquires position information that represents a position of a user who uses a document, and document information that represents the document from different acquisition origins;

a management unit that manages a pair of a first rule that specifies (i) an input location of the document and (ii) a first process executed on the document information corresponding to the document located in the input location that does not include transmitting the document information that the acquisition unit acquires to a target that the user uses and a second rule that specifies (i) the input location of the document and (ii) a second process executed on the document information corresponding to the document located in the input location that includes transmitting the document information to the target and a switch condition that represents a condition to switch the first rule to the second rule;

a switching unit that switches the first rule to the second rule when determining that the switch condition that the management unit manages is met on the basis of a change of the position information that the acquisition unit acquires; and an execution unit that, using a CPU, executes the second process determined based on the input location of the document corresponding to the document information acquired by the acquisition unit according to the second rule when the first rule is changed to the second rule by the switching unit.

* * * * *